United States Patent
Barroso et al.

(10) Patent No.: US 12,056,469 B2
(45) Date of Patent: Aug. 6, 2024

(54) AUTONOMOUS GENERATION OF GRC PROGRAMS

(71) Applicant: International Business Machines Corporation, Armonk, NY (US)

(72) Inventors: Filipe Joao Afonso Barroso, Medford, MA (US); Chester Lee, Westwood, MA (US); Silvia Lopez, Tewksbury, MA (US); Yuhong Yin, Westford, MA (US); Lakshmanan Annamalai, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 17/377,556

(22) Filed: Jul. 16, 2021

(65) Prior Publication Data

US 2023/0018159 A1     Jan. 19, 2023

(51) Int. Cl.
*G06F 8/35* (2018.01)
*G06F 16/11* (2019.01)
*G06N 20/00* (2019.01)
*G06Q 10/0637* (2023.01)
*G06Q 10/10* (2023.01)
*G06Q 40/06* (2012.01)
(Continued)

(52) U.S. Cl.
CPC .............. *G06F 8/35* (2013.01); *G06F 16/128* (2019.01); *G06N 20/00* (2019.01); *G06Q 10/06375* (2013.01); *G06Q 10/103* (2013.01); *G06Q 40/06* (2013.01); *G06Q 40/08* (2013.01); *G06Q 50/26* (2013.01)

(58) Field of Classification Search
CPC ......... G06F 8/35; G06F 16/128; G06N 20/00; G06Q 10/06375; G06Q 10/103; G06Q 40/06; G06Q 40/08; G06Q 50/26
See application file for complete search history.

(56) References Cited

U.S. PATENT DOCUMENTS 9,495,395 B2    11/2016 Chan et al.
9,619,367 B1 *   4/2017 Huang ................ G06F 11/3644
(Continued)

OTHER PUBLICATIONS

IBM, "GRC Calculations." OpenPages with Watson; https://www.ibm.com/docs/en/opw/8.2.0?topic=enhancements-grc-calculations. Published Jun. 10, 2020 and accessed on Jul. 16, 2021. 4 pages. 8.2.0.

*Primary Examiner* — Ziaul A Chowdhury
(74) *Attorney, Agent, or Firm* — Scully, Scott, Murphy & Presser, P.C.; Stosch Sabo

(57) ABSTRACT

Methods and systems for generating a computer program for a governance, risk, compliance (GRC) system are described. In an example, a processor may detect a change among a plurality of objects in the GRC system. The processor may generate a snapshot of the plurality of objects in response to the detected change. The snapshot may include the detected change among the plurality of objects. The processor may train a machine learning model using the snapshot. The trained machine learning model may indicate relationships among a set of related objects, where the related objects may be among the plurality of objects. The processor may generate a computer program based on the trained machine learning model. The computer program may include a set of instructions for setting a field value of an object among the set of related objects.

18 Claims, 6 Drawing Sheets

(51) Int. Cl.
  *G06Q 40/08* (2012.01)
  *G06Q 50/26* (2024.01)

(56) References Cited

U.S. PATENT DOCUMENTS

| | | |
|---|---|---|
| 10,021,138 B2 | 7/2018 | Gill et al. |
| 10,158,660 B1 | 12/2018 | Reguly et al. |
| 10,826,767 B2 | 11/2020 | Barkovic et al. |
| 10,853,161 B2 | 12/2020 | Ahad |
| 2009/0281845 A1 | 11/2009 | Fukuda et al. |
| 2010/0100965 A1 | 4/2010 | Darci |
| 2012/0232947 A1 | 9/2012 | McLachlan et al. |
| 2013/0159047 A1 | 6/2013 | Mayerle et al. |
| 2013/0247205 A1 | 9/2013 | Schrecker et al. |
| 2014/0129297 A1 | 5/2014 | Iwama et al. |
| 2018/0129947 A1* | 5/2018 | Cambot ............... G06N 5/04 |
| 2018/0336571 A1* | 11/2018 | Gilani ................. H04L 67/10 |
| 2022/0138151 A1* | 5/2022 | Yelheri ............ G06F 16/183 |
| | | 707/639 |
| 2022/0247760 A1* | 8/2022 | Shanker ........... G06F 9/45558 |

\* cited by examiner

AUTONOMOUS GENERATION OF GRC PROGRAMS

BACKGROUND

The present invention relates generally to governance, risk & compliance (GRC) assessments, and particularly to methods, computer systems, and computer program products for using machine learning to autonomously create computer programs that can be executed to set GRC fields and objects.

Governance, risk, and compliance (GRC) can be referred to as an organizational strategy for managing governance, risk management, and compliance with industry and government regulations. A governance, risk, and compliance (GRC) framework can provide a structured approach to align its information technology with business objectives, while managing risk and meeting regulatory compliance requirements. It also helps improve decision-making and performance through an integrated view of how well an organization manages risks. In an example, a GRC system can be a computing system that implements hardware and software applications (e.g., a GRC tool) to implement and manage the GRC framework.

SUMMARY

The summary of the disclosure is given to aid understanding of a governance, risk, and compliance system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the techniques, methods, and/or systems for designing and configuring integrated circuits to achieve different effects.

In some examples, a method for generating a computer program for a governance, risk, compliance (GRC) system is generally described. The method may include detecting, by a processor, a change among a plurality of objects in the GRC system. The method may further include generating, by the processor, a snapshot of the plurality of objects in response to the detected change. The snapshot may include the detected change among the plurality of objects. The method may further include training, by the processor, a machine learning model using the instance. The trained machine model may indicate relationships among a set of related objects. The related objects may be among the plurality of objects. The method may further include generating, by the processor, a computer program based on the trained machine learning model. The computer program may include a set of instructions for setting a field value of an object among the set of related objects.

In some examples, a system configured for generating a computer program for a governance, risk, compliance (GRC) system is generally described. The system may include a memory and a processor. The processor may be configured to be in communication with the memory. The processor may be configured to detect a change among a plurality of objects in a GRC system. The processor may be further configured to generate a snapshot of the plurality of objects in response to the detected change. The snapshot may include the detected change among the plurality of objects. The processor may be further configured to train a machine learning model using the instance. The trained machine model may indicate relationships among a set of related objects. The related objects may be among the plurality of objects. The processor may be further configured to generate a computer program based on the trained machine learning model. The computer program may include a set of instructions for setting a field value of an object among the set of related objects In some examples, a computer program product for generating a computer program in a GRC system is generally described. The computer program product may include a computer readable storage medium having program instructions embodied therewith. The program instructions may be executable by a processing element of a device to cause the device to detect a change among a plurality of objects in a GRC system. The program instructions may be further executable by a processing element of a device to cause the device to generate a snapshot of the plurality of objects in response to the detected change. The snapshot may include the detected change among the plurality of objects. The program instructions may be further executable by a processing element of a device to cause the device to train a machine learning model using the instance. The trained machine model may include relationships among a set of related objects. The related objects may be among the plurality of objects. The program instructions may be further executable by a processing element of a device to cause the device to generate a computer program based on the trained machine learning model. The computer program may include a set of instructions for setting a field value of an object among the set of related objects.

Further features as well as the structure and operation of various embodiments are described in detail below with reference to the accompanying drawings. In the drawings, like reference numbers indicate identical or functionally similar elements.

DETAILED DESCRIPTION

Figure 1:
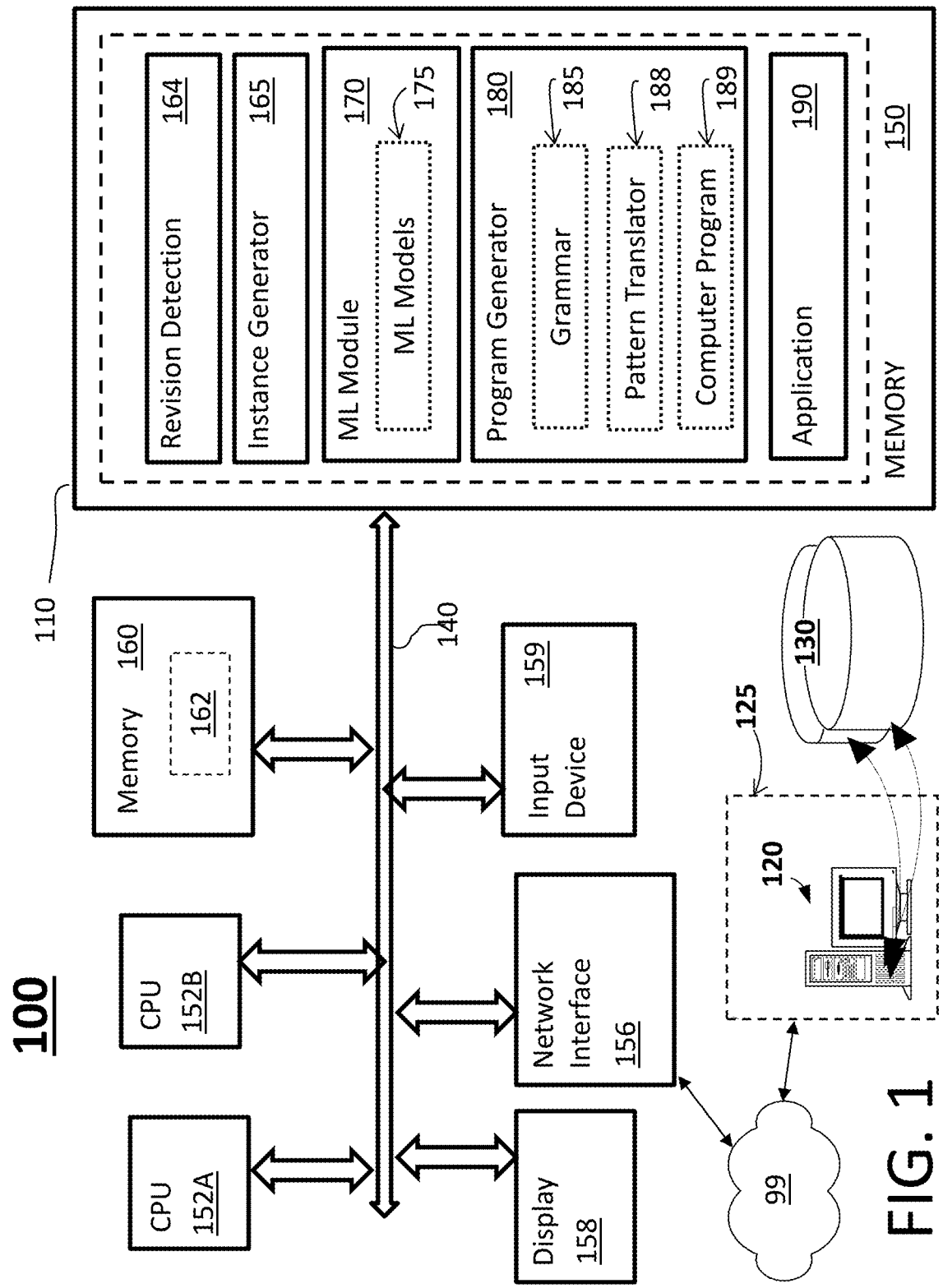
FIG. 1 illustrates an exemplary computer system or computing device that can implement autonomous generation of GRC programs in accordance with an embodiment.

The following description is made for illustrating the general principles of the invention and is not meant to limit the inventive concepts claimed herein. In the following detailed description, numerous details are set forth in order to provide an understanding of the system, method, and/or techniques for monitoring and assessing governance, risk, and compliance of an organization, however, it will be understood by those skilled in the art that different and numerous embodiments of the system and its method of operation may be practiced without those specific details, and the claims and disclosure should not be limited to the arrangements, structures, systems, assemblies, subassemblies, platforms, modules, functional units, circuitry, embodiments, features, aspects, processes, methods, techniques, and/or details specifically described and shown herein. Further, particular features, aspects, arrangements, structures, systems, assemblies, subassemblies, platforms, modules, functional units, circuitry, embodiments, methods, processes, techniques, details, etc. described herein can be used in combination with other described features, aspects, arrangements, structures, systems, assemblies, subassemblies, platforms, modules, functional units, circuitry, embodiments, techniques, methods, processes, details, etc. in each of the various possible combinations and permutations.

The following discussion omits or only briefly describes conventional features of information processing systems and data networks, including electronic data analytics programs or electronic risk assessment tools configured and adapted to monitor and recalculate an entity's business risk due to market changes, which should be apparent to those skilled in the art. It is assumed that those skilled in the art are familiar with data processing and data analytics including large scale data processing/analytics (also referred to as information/data processing systems) and their operation, and the application of data analytics, including data analytics systems and processes to monitor and calculate an entity's business risk. It may be noted that a numbered element is numbered according to the figure in which the element is introduced, and is typically referred to by that number throughout succeeding figures.

In GRC applications, governance can be referred to as a set of rules, policies, and processes that ensures an organization's activities are aligned to support an organization's goals. Governance can encompass ethics, resource management, accountability, and management controls. One example goal of governance is to balance the interests of multiple stakeholders, including management, personnel, suppliers, and investors. Governance can also provide control over facilities and infrastructures, such as data centers, as well as oversight of applications at the portfolio level.

In GRC applications, risk management can be referred to as a process of identifying, assessing, and controlling financial, legal, strategic, and security risks to an organization. To reduce risk, an organization may need to apply resources to minimize, monitor, and control the impact of negative events while maximizing positive events. In an example, a goal of an enterprise risk management program is to achieve corporate objectives while optimizing risk profile and securing value. A risk management program can also be applied to identify cybersecurity and information security threats and risks, such as software vulnerabilities and poor password practices, and implementing plans to reduce them.

In GRC applications, compliance involves adhering to rules, policies, standards, and laws set forth by industries and/or government agencies. Failing to do so could cost an organization in terms of poor performance, costly mistakes, fines, penalties, and lawsuits. Regulatory compliance covers external laws, regulations, and industry standards that apply to the company. Corporate or internal compliance covers rules, regulations, and internal controls set by an individual company. Compliance management programs internal to an organization can be integrated with external compliance requirements. The integrated compliance program should be based on a process of creating, updating, distributing, and tracking compliance policies and training personnel on those policies.

A GRC framework can help organizations establish policies and practices to minimize compliance risk. A GRC system can be a computing system that implements and manages the GRC framework. The GRC system can leverage timely information on data, infrastructures, and virtual, mobile, and cloud applications. In an example, the GRC system can be configured to set goals to improve efficiencies, reduce risks, and increase performance and return on investment (ROI). Further, GRC systems can be used for developing new GRC frameworks and updating existing GRC frameworks in an organization. An organization can use GRC systems to manage processes and data to maintain compliance with regulations, and monitor, measure, and predict losses and risk events. Also, GRC systems can correlate information in the context of the organization's processes, policies, and controls, as well as activities carried out by information technology, finance, human resource teams, and executives. In an example, GRC systems can facilitate management of different aspects of an organization, such as information technology, governance, financial controls management, policy management, etc.

Other tasks of a GRC system can include, but not limited to, 1) managing the lifecycle of financial and artificial intelligence (AI)-driven models and improve information technology compliance and controls; 2) quantifying regulatory and business requirements, and analyzing impact of these regulatory and business requirements to policy framework and support automated measurement and information technology (IT) controls through integration with third-party products; 3) setting and monitoring the organization's objectives with metrics defined in an associated GRC framework; 4) determining and mitigating risks associated with use, ownership, operation, involvement, influence, and adoption of IT within an organization; 5) creating, tracking, and storing digitized content; 6) managing and analyzing risk data to measure, quantify, and predict risk, and to determine strategies for reducing risk; 7) workflow management such as establishing, executing, and monitoring GRC-related workflows; 8) audit management such as organizing information and simplifying processes for conducting internal audits; 9) providing a user interface (e.g., a dashboard) that provides a central user interface where key performance indicators relevant to business processes and objectives can be monitored in real-time; 10) creating and distributing policies and controls and map them to regulations and compliance requirements, and assessing whether the controls have been deployed, are functioning correctly, and are improving risk assessment and mitigation.

FIG. 1 illustrates an exemplary computer system or computing device 100 that can implement autonomous generation of GRC programs in accordance with an embodiment. In an example, in a context of performing GRC assessment for an organization, the system 100 can be a computer system, a computing device, a mobile device, or a server configured to run an electronic GRC tool including software applications and models. The system 100 can be implemented in, for example, personal computers, laptops, tablets, smart devices, smart phones, or any other similar computing device etc. In some aspects, the system 100 can be implemented in, for example, a cloud computing platform, an embodiment of which is described in more detail in FIG. 5 and FIG. 6.

The system 100 may include one or more hardware processors 152A, 152B (also referred to as central processing units (CPUs)), a memory 150, a network interface 156, a display device 158, an input device 159, and any other features common to a computing device. In an example, memory 150 stores an operating system, application program interfaces (APIs), and program instructions. In some aspects, the system 100 may be, for example, any computing device that is configured to communicate with one or more external computing systems 125 including a web-based or cloud-based server 120 over a public or private communications network 99. For instance, an external computing system may be hosted by an entity different from an organization and includes servers that record or store information for the organization (e.g., social media platform, news media platform, etc.). The recorded or stored information can be stored in one or more databases, such as database 130, that can be accessed by computing systems 125. The system 100 can also include a local memory and/or an attached memory storage device 160, and/or or a remote memory storage device such as databases, that can be accessible via a remote network connection for input to the system 100.

In the embodiment depicted in FIG. 1, processors 152A, 152B may include, for example, a microcontroller, Field Programmable Gate Array (FPGA), or any other processor that is configured to perform various operations. Communication channels 140, such as wired connections including data bus lines, address bus lines, Input/Output (I/O) data lines, video bus, expansion busses, etc., are shown for routing signals between the various components of the system 100. Processors 152A, 152B may be configured to execute instructions as described below. These instructions may be stored, for example, as programmed modules in an associated memory storage device 150.

Memory 150 may include, for example, non-transitory computer readable media in the form of volatile memory, such as random access memory (RAM) and/or cache memory or others. Memory 150 may include, for example, other removable/non-removable, volatile/non-volatile storage media. By way of non-limiting examples only, memory 150 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows system 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100.

With respect to configuring the system 100 as a GRC system for monitoring and analyzing GRC parameters for an organization, the databases 130 and/or local or remote memory 160 may be configured to store data 162, where data 162 can be, for example, one or more databases including information and associated metadata relating to the organization. In an example, the data 162 stored in the memory 160 can be data local to a computing device including the CPUs 152a and 152b (e.g., data accessible by CPUs 152A, 152B without being connected to network 99). The data 162 can be related to an organization such as resources, inventory, policies, events, projects, personnel information, key performance indicators, investments, infrastructure. In an example, the databases 130 can store data that can be accessed via the network 99, such as stock market quotes and prices, news articles, social media data, compliance rules and policies of entities external to the organization, being stored by external computing systems 125. In an example, updates to the databases 130 and/or the data 162 that may be used by a GRC system can include regulatory updates from local towns and cities, countries, updates to compliance requirements from general data protection regulation (GDPR) for IT risk, vendor information, incident management, and/or system and organization controls (e.g., SOC2) related items such as different types of processes, risk, and controls.

Memory 150 of computer system 100, in one or more embodiments, can be configured to store processing modules that include programmed instructions (e.g., source code and/or machine code) adapted to perform functions to generate a computer program that can be used for setting parameter values in a GRC tool or GRC application as discussed below. Note that the processing modules shown in FIG. 1 is an example embodiment. It will be apparent to a person of ordinary skill in the art that the processing modules shown in FIG. 1 can be combined, separated, and additional processing modules may be stored in the memory 150.

In an embodiment, one of the programmed processing modules stored at the associated memory 150 can include a revision detection module 164 that can be configured to detect changes to information and data stored in the databases 130 and/or the memory 160. The changes that can be detected by the revision detection module 164 can include changes being made by user inputs, changes being made by a component among the system 100, or changes being made to the databases 130 by another computing system. In response to a detection of changes to information and data stored in the databases 130 and/or the memory 160, the revision detection module 164 can notify an instance generator 165 that changes are detected. The instance generator 165 can be another programmed processing module stored in the memory 150. The instance generator 165 can be configured to obtain or generate a snapshot of the databases 130 and/or information stored in the memory 160. In an example, a snapshot (e.g., of a database or more than one database) being generated by the instance generator 165 can be a database instance including values of every field in the database(s) at the time or instance that the snapshot was obtained. Thus, the instance generator 165 can generate an individual snapshot for every change or revision that is made to the data stored in the databases 130 and/or memory 160.

In an embodiment, memory 150 can further include a machine learning (ML) module 170 configure to generate training data and to train machine learning models. The ML module 170 can be another programmed processing module stored in the memory 150. In an example, ML module 170 can receive one or more instances from the instance generator 165. The ML module 170 can convert the one or more instances into training data for training machine learning (ML) models 175. The ML module 170 can run the trained ML models 175 to output one or more patterns, where the patterns can indicate behavior, correlations, relationships, among different fields and/or objects in the databases 130 and/or the data stored in the memory 160. In an embodiment, the ML models 175 can include, but not limited to, pattern recognition models, classification models, regression models, clustering models, artificial neural networks (e.g., convolutional neural networks, deep neural networks, etc.), decision trees, association rules, and/or other types of machine learning models that can implement the methods described in accordance with the present disclosure.

Memory 150 can further include a program generator 180 configured to generate one or more computer programs based on the patterns outputted from the ML models 175. The program generator 180 can be one of the programmed processing modules stored in the memory 150. The program generator 180 can include a grammar module 185, where the grammar module 185 can include, for example, rules, mappings, keywords, conditions, constraints, requirements, relationship among keywords/database fields/objects, etc. In an example, the grammar module 185 can include one or more programming libraries having different sets of programming code that can be called by a computer program being executed by the system 100. In an example, the grammar module 185 can include programming syntax and associated definitions, conditions, and constraints, where the programming syntax can be proprietary to a specific GRC tool or application (e.g., an application 190). The program generator 180 can further include a pattern translator 188. In an example, the pattern translator 188 can be a programmed processing module that can be called by the program generator 180. The pattern translator 188 can be configured to apply the data (e.g., rules, syntax, library, etc.) in the grammar module 185 to outputs (e.g., patterns, classifications, etc.) of the ML models 175 to translate or convert the ML models 175 into one or more computer programs, such as a computer program 189, that can be outputted by the program generator 180.

In an example, the computer program 189 can include a set of instructions, such as source code, that can be interpreted by a user of the system 100. In an example, the set of instructions in the computer program 189 can be unique (e.g., different from other computer programs). In other words, each computer program 189 can have a unique set of instructions such as a unique set and/or sequence of variables and/or operators. Further, the unique set of instructions of each computer program 189 can be executed for setting or updating one or more fields of an object. For example, the computer program 189 can be designed for a risk object including multiple negative events fields, and a value indicating a presence of any one of the negative events can set or update a risk level field of the risk object. In an example, multiple computer programs can be generated for the same object type, but each one of the multiple computer programs can include a unique set of instructions to set or update the fields of the same object type. By using revision history of multiple revisions or changes, detected by the revision detection module 164, to train the ML models 175 and to generate the computer program 189, a user of the system 100 may not need to manually write computer code to generate the computer program 189. Thus, the system 100 can be implemented to autonomously generate computer programs for users who may not be proficient with computer programming, or may not be proficient with the proprietary programming syntax that may be stored in the grammar module 185. Further, the ML models 175 may identify and output patterns or conditions that may be used for enhancing the grammar module 185 (e.g., discovering new operators, syntax, etc.). Furthermore, the ML models 175 may identify and output patterns or conditions that may not be previously known. For example, patterns being outputted by the ML models 175 may discover new relationships among different GRC objects.

In an example, the memory 150 can store an application 190, where the application 190 can be a GRC tool that can output audio and/or visual content, or other types of sensory content (e.g., refreshable braille reader), to a computing device. For example, the application 190 can be executed by the CPUs 152A and/or 152B to output a user interface on the display 158. The user interface of the application 190 can be used for displaying contents relating to the system 100, such as data stored in the databases 130 and/or memory 160, the grammar module 185, the computer program 189, and/or other content such as statistics, reports, etc. In an example, the computer program 189 can be displayed on the user interface for a user to review and edit. Upon an approval by the user, the computer program 189 can be published or enabled in the application 190 such that the computer program 189 can start to function autonomously. The published computer program 189 can autonomously set or update fields of GRC objects in response to changes detected by the revision detection 164. For example, a risk object can correspond to multiple types of risks, and the computer program 189 can be implemented to set different fields for each type of risk among the risk objects.

In an example, the computer program 189 can be referred to as a GRC calculation. A GRC calculation can be formed by multiple operations categorized into different types of operations, such as input field operation, variable operation, and set field operation. An input field operation can retrieve values from an input field that is to be used in an operation of the GRC calculation. An input field operation can be from the current object or a related object. Conditions can be defined on the input field. A GRC calculation can have multiple input field operations. Variable operations can include intermediary values that can be used in an operation in the GRC calculation. A variable operation can include an expression that can use one or more of previously defined input fields operations, variables operations, or set field operations. A GRC calculation can have multiple variable operations. The set field operation can set a field value on an object. A set field operation contains an expression that can use all previously defined operations including input fields, variables, or other set field operations.

A goal of a GRC calculation is to execute one or more set field operations to set values for one or more fields on an object, based on the values of one or more other fields. A GRC calculation can have multiple set field operations to set or update multiple fields. A sequence of operations defined for a single GRC calculation cannot be shared among multiple GRC calculations. The program generator 180 can be configured to autonomously generate GRC calculations (e.g., computer program 189) without a user input to setup the input field operations, the variable operations, and the set field operations. For example, the program generator 180 can identify one or more input field operations, variable operations, and set field operations based on the ML models 175. A GRC calculation can be static and versioned. For example, each time a calculation is published or enabled, a previous calculation for the same object can be deactivated. In response to a calculation definition being deactivated, no new calculation can be run. An object or object type can have multiple calculations, and each calculation can set different fields such that no two calculations can set the same field. A calculation runs for all objects that qualify for it, given the applicability and input field conditions.

In an example, a field in a GRC object can represent information that is specific to an object type of the GRC object. For example, a risk object's input field can retrieve values of an event field indicating presence or absence of an event, a variable operation can use the event field as an input to an operand or an operation to determine a risk score, and the determined risk score can be used for the set field of the risk object. In an example, a field definition of a field can store information relating to the field such as a data type, the object it belongs to, whether it is a required field in a calculation or not, etc. In an example, to configured the system 100 as a GRC system, the memory 150, the memory 160, and/or the databases 130 may store the instructions of one or more GRC calculations, objects, fields and field definitions, correlations and relationships among the stored objects and fields, etc.

In an example, a calculation can run in response to various actions, such as an object being created, a field of an object or a related object being updated, associating an existing related object to another object, starting a workflow that creates an object for an object type that has a calculation, completing a stage in a workflow that updates a calculation's input field that is used in a calculation or in a related object, completing a stage in a workflow that associates an existing related object to another object, etc.

In an example, a GRC system may require a user to manually provide user inputs indicating variables, operators, and commands, to define a sequence of instructions that can form a GRC calculation. In an example, the manual input from the user may require the user to have knowledge of the correlations or relationships among different GRC object types and different types of data that can be obtained by the GRC system. However, the user may not be aware of all existing correlations and may cause certain conditions that may impact the result of the GRC calculation to be omitted in the user input. The system 100 can configure a GRC system to autonomously generate the GRC calculations without user knowledge of all existing correlations. The autonomously generated GRC calculations can be based on machine learning models that are trained based on system usage (e.g., revision history of different fields in different GRC objects). Thus, GRC calculations can be generated without being provided with certain object correlations that may be unknown to users. Further, the autonomous generation of GRC calculations may not require users to have prior knowledge of specific key result indicators (KRI) or key performance indicators (KPI), or knowledge of proprietary syntax and programming language of the GRC system. The autonomously generated GRC calculations can span multiple objects (e.g., set or update fields in multiple objects) rather than just a singular object. Further, users may not need to specify a start point or stop point for the GRC system to analyze potential GRC calculations. For example, a user may not need to set a start point that determines an amount of training data to be used (e.g., changes to an object in the past month or in a particular time range, or the recent N changes or revisions, etc.). Furthermore, the autonomously generated GRC calculation can be reviewed or edited by users prior to publishing, thus providing flexibility between GRC calculation generations using the autonomous approach and the manual approach.

Figure 2:
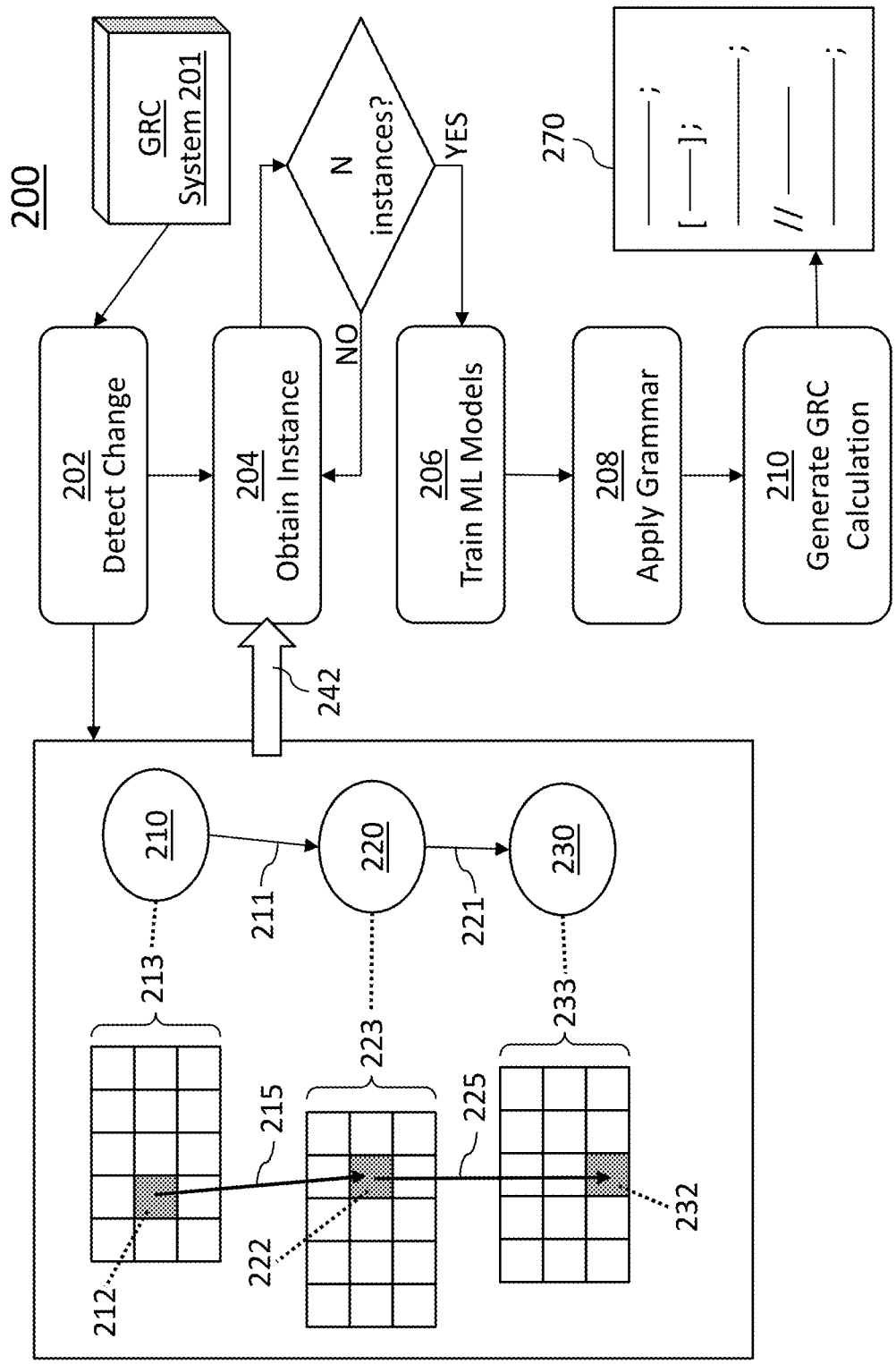
FIG. 2 illustrates an example process that can be implemented by the computer system of FIG. 1 in accordance with an embodiment.

FIG. 2 illustrates an example process 200 that can be implemented by the computer system 100 of FIG. 1 in accordance with an embodiment. The process 200 can include one or more operations, actions, or functions as illustrated by one or more of blocks 202, 204, 206, 208, and/or 210. Although illustrated as discrete blocks, various blocks can be divided into additional blocks, combined into fewer blocks, eliminated, performed in parallel, and/or performed in a different order, depending on the desired implementation.

The process 200 can be performed by a processor (e.g., CPUs 152a and/or 152b shown in FIG. 1) of a GRC system 201. In an example, the GRC system 201 can include one or more of the CPUs 152a and 152b, and the programmed processing modules stored in the memory 150, shown in FIG. 1. The process 200 can begin at block 202. At block 202, the processor 201 can detect a change to a plurality of objects among the GRC system 201. In the example shown in FIG. 2, the plurality of objects among the GRC system 201 can include an object 210, an object 220, and an object 230. Each one of the objects 210, 220, 230 can include a plurality of fields 213, 223, 233, respectively. The objects 210, 220, & 230 can be of the same object type (e.g., issue object type), or they can be objects of different object types (e.g., business entity, risk, control, etc.). Each field among the fields 213, 223, 233 can be set or updated to a value based on values of other fields or values from user inputs. In the example shown in FIG. 2, the object 210 can be related to the object 220 by a relationship 211, and the object 220 can be related to the object 230 by a relationship 221. The relationships 211 and 221 can be stored and defined in, for example, databases 130 and/or the data 162 stored in the memory 160 shown in FIG. 1. The grammar module 185 may include defined syntax that allow the GRC calculation to access and operate on the relationships stored in the databases 130 and/or memory 160. In an example, the changes that can be detected at block 202 can include an addition of an object to the GRC system 201, an addition or a change of a relationship among objects, a file type change to a field, adding or removing an association of a file type with an object, changes to a filter being applied to the field, a behavior of a field (e.g., visible, editable, or required), etc.

In an example, the processor 201 can detect a change to a value of a field 212 in the object 210. Based on the relationship 211, the change to the value of the field 212 can also change a value of a field 222 in the object 220. Further, based on the relationship 221, the change to the value of the field 222 can also change a value of a field 232 in the object 230. In an example, the value change to the field 212 can trigger a first GRC calculation to set or update the value of the field 222, and the value change to the field 222 can trigger a second GRC calculation to set or update the value of the field 232. However, since there is no existing relationship between the object 210 and the object 230, the first GRC calculation may not set or update the value of the field 232 in response the value change of the field 212. In an example, if the objects 210, 220, & 230 are objects of different object types (e.g., business entity, risk, & control), then the first GRC calculation can be, for example, a GRC calculation for risk that detects that field 212 was modified and needs to set 222 accordingly, and the second GRC calculation can be, for example, a GRC calculation for control that would detect that when field 222 is changed it needs to update field 232.

The process 200 can proceed from block 202 to block 204. At block 204, the processor 201 can obtain or generate an snapshot 242 of the plurality of objects 210, 220 230 in response to the detected change. The snapshot 242 can indicate the updated values of the fields 213, 223, 233 of the objects 210, 220, 230, respectively. In an example, if the plurality of objects and their field values are stored as databases, then the snapshot 242 can be a database instance showing data stored in the databases at a particular moment of time (e.g., the time in which the instance is generated). The processor 201 can store the snapshot 242 in memory, such as, for example, one of the memory 150 and/or memory 160 shown in FIG. 1. The memory 150 and/or 160 can be configured to store multiple instances of the plurality of objects such that a revision history of the plurality of objects can be recorded and tracked.

The process 200 can proceed from block 204 to block 206. At block 206, the processor 201 can train machine learning models (e.g., ML models shown in FIG. 1) using the snapshot 242 obtained in block 204. In an example, the processor 201 can transform snapshot 242 into training data for the ML models. The processor 201 can train the ML models in a supervised or unsupervised manner. For example, for supervised training, the processor 201 can use the value of the field 212 as training input, and the value of the field 222 as a training label, to train ML models that can predict how the field 222 changes with the field 212. In another example, for unsupervised training, the processor 201 can use the values of the fields 212, 222, 232 as training inputs to allow the ML models to discover new patterns and/or relationships among the objects 210, 220, 230. In an example, an instance threshold for setting a number or an amount of snapshots or instances to be used for training the ML models can be defined in the grammar module 185. For example, the processor 201 can update the training data and retrain the ML models for every N different instances obtained in block 204.

The process 200 can proceed from block 206 to block 208. At block 208, apply the grammar module 185 (shown in FIG. 1) to the ML models. In an example, the processor 201 (e.g., or pattern translator 188 in FIG. 1) can apply the grammar module 185 on patterns representing the ML models to identify input fields (e.g., field 212 and field 222), and variable operation fields (e.g., operators in relationships 211, 221), and set operation fields (e.g., field 232), that may be needed to form a GRC calculation. For example, in response to the ML models showing that the field 222 changes with the field 212, the processor 201 can attempt to identify, in the grammar module 185, any relationship between the fields 212 and 222. In the example shown in FIG. 2, the processor 201 can identify the relationship 211 in the grammar module 185. The grammar module 185 may specify various properties of the relationship 211, such as constraints on values of the fields involved (e.g., fields 212 and 222), a condition to apply, or not to apply specific operations indicated by the relationship 211, etc. In an example, depending on a field's data type (e.g., boolean, number, currency, date, user, text, list, etc.), the grammar module 185 may specify and/or filter which functions, actions, operations, may be applicable for that field. For example, a multiplication operator cannot be applied to multiply usernames with dates, but can be applied to multiply currency with numbers. In response to identifying the relationship 211 and associated properties in the grammar module 185, the processor 201 can generate one or more instructions based on the identified relationship 211 and associated properties. For example, the one or more instructions generated by the processor 201 can include program code to execute an operation indicated by the relationship 211 on the field 212 in response to a change in the field 212, and setting or updating the field 222 based on a result of the executed operation.

Further, based on the ML Models indicating that the values of the field 232 changes in response to changes to the field 212, the processor 201 can attempt to identify a relationship between the objects 210 and 230 that may be stored as data 162 in the memory 160 shown in FIG. 1. In response to failing to identify any relationship between the objects 210 and 230, the processor 201 can create a new relationship between the objects 210 and 230. For example, the processor 201 can be configured to use regression analysis to determine a function or operation that can take the field 212 as an input and output the field 232 indicated in the patterns generated in block 208. In another example, a pattern representing the ML models can include a relationship between the fields 212 and 232. The processor 201 can update the data 162 stored in the memory 160, and/or the pattern translator 188 (e.g., add new relationships or algorithms), to include the new relationship between the objects 210 and 230 and the determined operation. The processor 201 can also update the data 162 and/or the pattern translator 188 with various properties of the new relationship, such as constraints on values of the fields involved (e.g., fields 212 and 232), a condition to apply or not to apply specific operations indicated by the new relationship, etc. In response to updating the data 162 and/or the pattern translator 188 with the new relationship and associated properties, the processor 201 can generate instructions based on the new relationship and associated properties. For example, the instructions generated by the processor 201 can include program code to execute an operation indicated by the new relationship on the field 232 in response to a change in the field 212, and setting or updating the field 232 based on a result of the executed operation.

The process 200 can proceed from block 208 to block 210. At block 210, the processor 201 can generate a computer program or a GRC calculation 270. In an example, the instructions generated in block 208 can be combined by the processor 201 to form a set of instructions for the GRC calculation 270. For example, the processor 201 can set the instructions generated based on the relationship 211 between the fields 212 and 222 as one of the variable operations field of the GRC calculation 270. The processor 201 can also set the instructions generated based on the new relationship determined between the fields 212 and 232 as one of the variable operations field of the GRC calculation 270. The processor 201 can also set the field 212 as an input field of the GRC calculation 270. The fields 222 and 232, which are dependent on the input field 212, can be set or updated autonomously by the GRC calculation 270. Thus, the GRC calculation autonomously generated from the process 200 can set the fields 222 and 232 in response to the same change to the field 212. The processor 201 can output the GRC calculation 270 on a user interface being outputted by a GRC tool (e.g., application 190 shown in FIG. 1). A user of the GRC tool can view the GRC calculation 270 and can determine whether to approve a publication of the GRC calculation 270 on the GRC tool. In response to an approval by the user, the GRC calculation 270 can be published or enabled on the GRC tool, such that any changes to any one field included in the instructions of the GRC calculation 270 can set the fields assigned as set field operations in the GRC calculation. In an example, the user may request revision to the GRC calculation by modifying certain fields or operations in the instructions of the GRC calculation, and the processor 201 can revise the GRC calculation 270 according to the user request before receiving an approval to enable the GRC calculation 270.

In an example, the object 210 can be a first type of risk, the object 220 can be a process that can be impacted by the first type of risk, and the object 230 can be a second type of risk that can be impacted by the process. The processor 201 can generate the computer program 270 to span multiple objects (e.g., objects 210, 220, 230) such that when the computer program 270 is executed, values of multiple fields in the objects 210, 220, 230 can be set in response to the same change. In an example, the computer program 270 can be defined for process, and may take the field 212 as an input field, where the field 212 can be a risk field. As the risk field 212 changes, the computer program 270 can set the value of the process field 222. The GRC system 201 may generate a different computer program (e.g., different from the computer program 270) defined for a risk object that takes the process input field 222 as input, and sets the value of 232 in response to changes to the process input field 222. Thus, updating the field 212 would cause the computer program 270 to update the field 222, then once the GRC system 201 detects field 222 was modified, the GRC system 201 would trigger the different computer program to run and update the field 232 in response to the change to the field 222. The autonomous generation of the GRC calculation 270 can address an issue where manual user input (e.g., write programming code) may neglect a relationship between the objects 210 and 230, by identifying the new relationship between the objects 210 and 230. Further, by retraining the ML models using revision history (e.g., the N instances), the ML models can be updated according to trends on the object relationships. For example, the relationship 211 between the objects 210 and 220 can become outdated (e.g., field 222 no longer changes in response to changes in field 212) after a certain amount of time. The ML models can be retrained to reflect that the relationship 211 is outdated without a user being aware that the relationship 211 is outdated.

In an example, the processor 201 can run a test on the GRC calculation 270 prior to enabling the GRC calculation 270 or prior to outputting the GRC calculation 270 on the user interface for approval. The test can begin with running the GRC calculation 270 using a set of default values of the input fields. For example, the processor 201 can run the GRC calculation on a default value of the field 212. The default value of the field 212 can cause the GRC calculation to set the field 222 to a first value. A test threshold can be defined in the grammar module 185 to set a constraint on the value of the field 222, such as the field 222 cannot exceed a value of X. In response to the first value being less than X, the processor 201 can adjust (e.g., increase or decrease) the default value of the field 212 and run the GRC calculation 270 again to obtain a second value of the field 222. The processor 201 can compare the second value with X and determine whether to continue adjusting the value of the field 212, or to stop the adjustment and set a current value of the field 212 as an constraint to prevent the GRC calculation being executed in response to an undesirable value being updated or set in field 212.

The process 200 can proceed from block 206 to block 208. At block 208, apply the grammar module 185 (shown in FIG. 1) to the ML models. In an example, the processor 201 can apply the grammar module 185 on patterns representing the ML models to identify input fields (e.g., field 212 and field 222), and variable operation fields (e.g., operators in relationships 211, 221), and set operation fields (e.g., field 232), that may be needed to form a GRC calculation. For example, in response to the ML models showing that the field 222 changes with the field 212, the processor 201 can attempt to identify, in the grammar module 185, any relationship between the fields 212 and 222. In the example shown in FIG. 2, the processor 201 can identify the relationship 211 in the grammar module 185. The grammar module 185 may specific various properties of the relationship 211, such as constraints on values of the fields involved (e.g., fields 212 and 222), a condition or an operation to apply, or not to apply specific operations indicated by the relationship 211, etc. In response to identifying the relationship 211 and associated properties in the grammar module 185, the processor 201 can generate one or more instructions based on the identified relationship 211 and associated properties. For example, the one or more instructions generated by the processor 201 can include program code to execute an operation indicated by the relationship 211 on the field 212 in response to a change in the field 212, and setting or updating the field 222 based on a result of the executed operation.

Further, based on the ML Models indicating that the values of the field 232 changes in response to changes to the field 212, the processor 201 can attempt to identify a relationship between the objects 210 and 230 in the grammar module 185. In response to failing to identify any relationship between the objects 210 and 230, the processor 201 can create a new relationship between the objects 210 and 230. For example, the processor 201 can be configured to use regression analysis to determine a function or operation that can take the field 212 as an input and output the field 232 indicated in the patterns generated in block 208. In another example, a pattern representing the ML models can include a relationship between the fields 212 and 232. The processor 201 can update the data 162 to include the new relationship between the objects 210 and 230 and the determined operation. The processor 201 can also update the data 162 with various properties of the new relationship, such as constraints on values of the fields involved (e.g., fields 212 and 232), a condition to apply or not to apply specific operations indicated by the new relationship, etc. In response to updating the data 162 with the new relationship and associated properties, the processor 201 can generate instructions based on the new relationship and associated properties. For example, the instructions generated by the processor 201 can include program code to execute an operation indicated by the new relationship on the field 232 in response to a change in the field 212, and setting or updating the field 232 based on a result of the executed operation.

The process 200 can proceed from block 208 to block 210. At block 210, the processor 201 can generate a computer program or a GRC calculation 270. In an example, the instructions generated in block 208 can be combined by the processor 201 to form a set of instructions for the GRC calculation 270. For example, the processor 201 can set the instructions generated based on the relationship 211 between the fields 212 and 222 as one of the variable operations field of the GRC calculation 270. The processor 201 can also set the instructions generated based on the new relationship determined between the fields 212 and 232 as one of the variable operations field of the GRC calculation 270. The processor 201 can also set the field 212 as an input field of the GRC calculation 270. The fields 222 and 232, which are dependent on the input field 212, can be set or updated autonomously by the GRC calculation 270 if the objects 220 and 230 are of the same object type (e.g., both risk, or both process, etc.). If the objects 220 and 230 are from different object types, then two GRC calculations may be needed, such as one being for setting the field 222 and another one for setting the field 232. Thus, the GRC calculation autonomously generated from the process 200 can set the fields 222 and 232 in response to the same change to the field 212. In another example, the computer program 270 can include instructions that can set a specific field in the object 210 in response to changes to the field 212. For example, if a field "category" of a risk object is set to a particular value, the computer program 270 may set an "owner" field of the same risk object to another particular value.

The processor 201 can output the GRC calculation 270 on a user interface being outputted by a GRC tool (e.g., application 190 shown in FIG. 1). A user of the GRC tool can view the GRC calculation 270 and can determine whether to approve a publication of the GRC calculation 270 on the GRC tool. In response to an approval by the user, the GRC calculation 270 can be published or enabled on the GRC tool, such that any changes to any one field included in the instructions of the GRC calculation 270 can set the fields assigned as set field operations in the GRC calculation. In an example, the user may request revision to the GRC calculation by modifying certain fields or operations in the instructions of the GRC calculation, and the processor 201 can revise the GRC calculation 270 according to the user request before receiving an approval to enable the GRC calculation 270.

In an example, the object 210 can be a first type of risk, the object 220 can be a process that can be impacted by the first type of risk, and the object 230 can be a second type of risk that can be impacted by the process. The processor 201 can generate the computer program 270 to span multiple objects (e.g., objects 210, 220, 230) such that when the computer program 270 is executed, values of multiple fields in the objects 210, 220, 230 can be set in response to the same change. The autonomous generation of the GRC calculation 270 can address an issue where manual user input (e.g., write programming code) may neglect a relationship between the objects 210 and 230, by identifying the new relationship between the objects 210 and 230. Further, by retraining the ML models using revision history (e.g., the N instances), the ML models can be updated according to trends on the object relationships. For example, the relationship 211 between the objects 210 and 220 can become outdated (e.g., field 212 no longer changes with field 222) after a certain amount of time. The ML models can be retrained to reflect that the relationship 211 is outdated without a user being aware that the relationship 211 is outdated.

Figure 3:
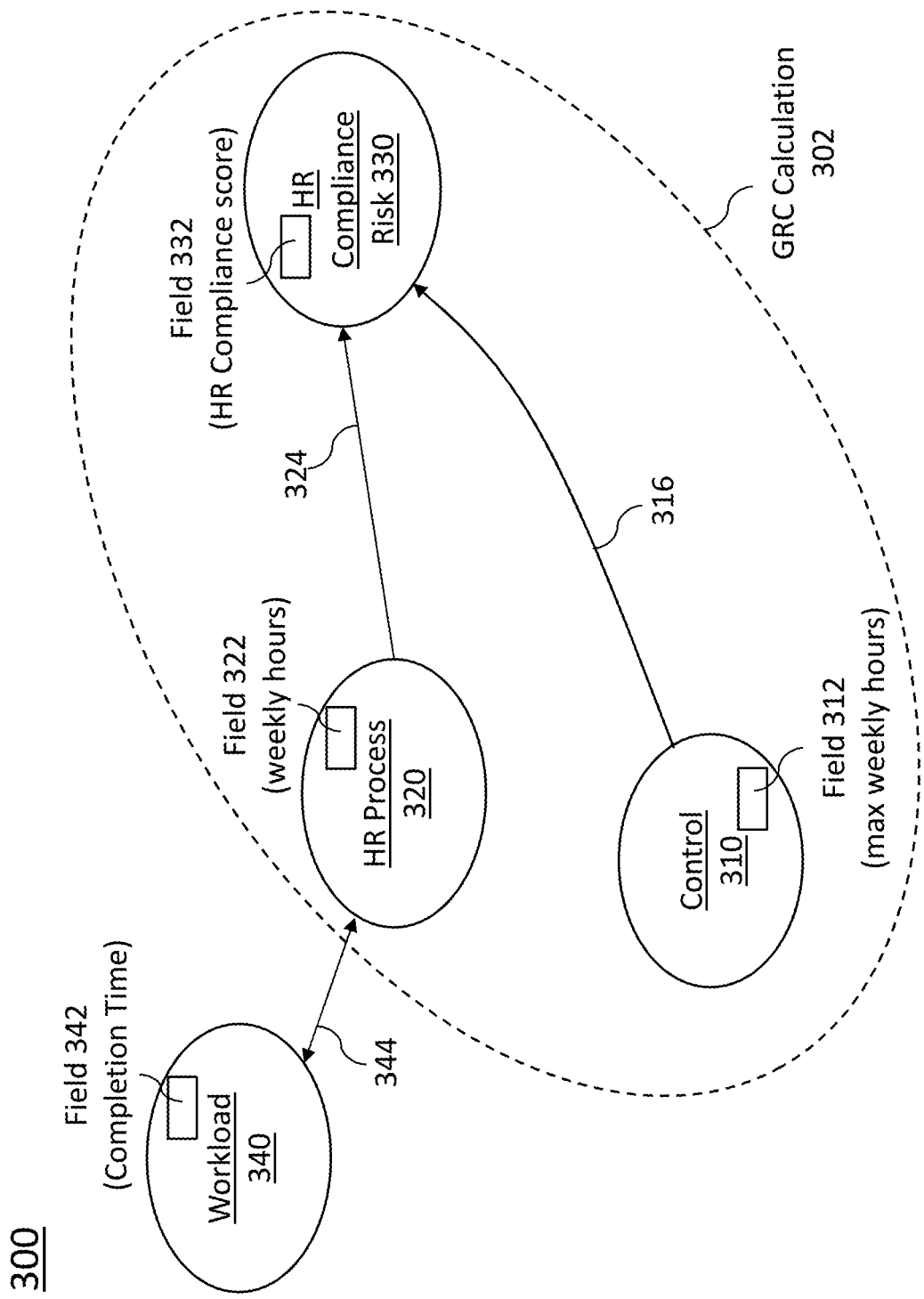
FIG. 3 illustrates an example network that can utilize the computer system of FIG. 1 in accordance with an embodiment.

FIG. 3 illustrates an example network 300 that can utilize the computer system of FIG. 1 in accordance with an embodiment. The network 300 can include a plurality of objects 310, 320, 330, and 340. The plurality of objects 310, 320, 330, and 340 can be among a GRC system (e.g., system 100 shown in FIG. 1 or GRC system 201 shown in FIG. 2). In an example, the plurality of objects 310, 320, 330, and 340 can be stored in a memory as programming objects and/or database objects. In an example, the object 310 can be a control object. A control object in a GRC system can be an object representing policies and procedures that can ensure risk mitigation responses are performed. For example, in response to identifying potential risk in an organization, controls such as approvals, authorizations, and verifications may need to be established to mitigate (e.g., control, remove, limit, or transfer) the potential risk. In an example, the objects 320 and 340 can be process objects. A process object can represent the end-to-end activities or processes within an organization that may be subject to risk. The object 330 can be a risk object. A risk object can represent potential liabilities associated with processes, entities, or a compliance with a mandate. Risk objects can be used for categorizing risks by using quantitative scores, such as frequency, rating, and severity. In an example, risk objects can include fields representing tasks or data such as computed risk data, commands to generate and view reports, and to sort risk items (e.g., identify top risk).

In the example shown in FIG. 3, the object 310 can represent a control that is established in response to an identification of a human resource (HR) compliance risk represented by the object 330. The object 320 can represent a HR process that may be subject to the HR compliance risk represent by the object 330. In an example, a field 312 of the object 310 can represent a maximum weekly hours defined by a government entity. A field 322 of the object 320 can represent a number of weekly hours the organization assigned to employees. A field 332 of the object 330 can represent a risk score indicate whether the number in field 322 impose a potential compliance risk on the organization based on a comparison between the number in the field 322 and the field 312. For example, the field 332 can indicate a low score in response to the field 322 having a number that is significantly lower than the value in field 312, and can indicate a high score in response to the field 322 having a number that is in proximity to the value in field 312. The object 340 can represent a work process to monitor workload of employees, such as a process that track tasks to estimate a completion time (represented by the field 342) to complete a project.

The object 320 can be related to the object 330 by a relationship 324. In an example, the relationship 324 can include a condition stating the field 322 can be used for setting the field 332. The object 310 can also be related to the object 330 by a relationship 316. In an example, the relationship 316 can include a condition stating the field 312 can also be used for setting the field 332. In an example, an existing GRC calculation 302 can automatically set the field 332 in response to changes in the field 312 and/or the field 322. For example, if a policy changes where the maximum weekly work hours in field 312 is decreased, and employees are assigned to work the same number of hours weekly (e.g., field 322 remains unchanged), then a difference between fields 312 and 322 decreases, and the existing GRC calculation 302 can automatically increase the score in the field 332. In another example, if a user decreases the number of weekly hours assigned in field 322 while the field 312 remains unchanged, then a difference between fields 312 and 322 increases, and the existing GRC calculation can automatically decrease the score in the field 332.

The object 320 can also be related to the object 340 by a relationship 344. In an example, the relationship 344 can include a condition stating the field 342 may need to up updated in response to changes to the field 322. In other words, a decrease in weekly work hours of the employees (e.g., field 322) responsible for a project can delay an estimated completion time of the project (e.g., field 342). In another example, a user can modify the field 342 to move the completion time of the project to an earlier data and/or time, causing an increase in the weekly hours being assigned to the employees (e.g., increases field 322). Thus, the change to the field 322 may indirectly impact the HR compliance score in the field 332. However, the existing GRC calculation 302 may not use the field 342 for setting the field 332 due to, for example, no known relationship between object 310 and object 340.

An implementation of the system 100 or the GRC system 201 can generate a new GRC calculation that may update or set the field 332 in response to changes to the field 312 and the field 342. The new GRC calculation can replace the existing GRC calculation 302 because both the new GRC calculation and the existing GRC calculation 302 are configured to set the same field 332. In an example, every time at least one of the fields among the objects 310, 320, 330, 340 changes, a snapshot of an entirety of objects within the GRC system, including the objects 310, 320, 330, 340, can be obtained. Thus, the obtained snapshots can include changes among objects that may be related or unrelated. The snapshots can be obtained over time, and can be accumulated to form a revision history. The revision history can be used as training data for training one or more machine learning models (e.g., ML models 175 shown in FIG. 1). In an example, the revision history can indicate that every time one or more of the field 312 and the field 342 changes, the HR compliance score in the field 332 is also changed. Thus, the trained machine learning models can indicate that the field 342 of the object 340 can be correlated to the field 332 of the object 330. Based on the trained machine learning models, the GRC system can generate a new GRC calculation to set or update the field 332 in response to changes to the field 312 and/or the field 342.

Figure 4:
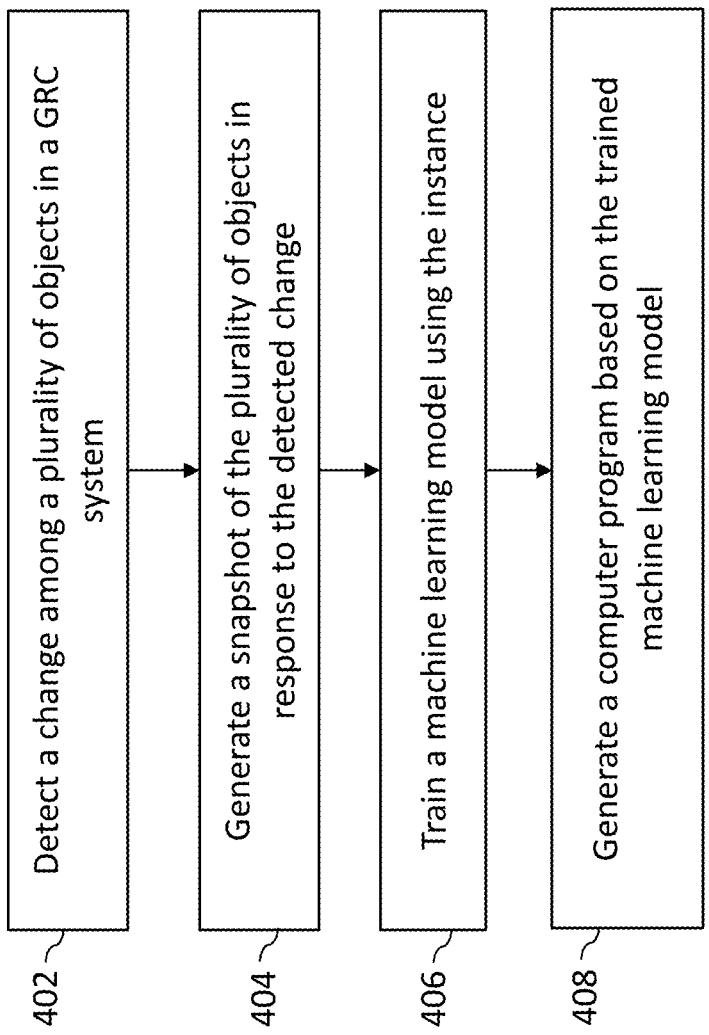
FIG. 4 illustrates an example flowchart example of autonomous generation of GRC programs in accordance with an embodiment.

FIG. 4 illustrates an example flowchart example of autonomous generation of GRC programs in accordance with an embodiment. A process 400 can include one or more operations, actions, or functions as illustrated by one or more of blocks 402, 404, 406, and/or 408. Although illustrated as discrete blocks, various blocks can be divided into additional blocks, combined into fewer blocks, eliminated, performed in parallel, and/or performed in a different order, depending on the desired implementation.

The process 400 can begin at block 402. At block 402, a processor may detect a change among a plurality of objects in a GRC system. The process 400 can proceed from block 402 to block 404. At block 404, the processor may generate a snapshot of the plurality of objects in response to the detected change. The snapshot may include the detected change among the plurality of objects and their respective field and field values. The process 400 can proceed from block 404 to block 406. At block 406, the processor may train a machine learning (ML) model using the snapshot. The trained machine learning (ML) model may indicate relationships among a set of related objects. The related objects may be among the plurality of objects. In an example, the processor may determine an amount of snapshots stored in a memory. The processor may train the machine learning (ML) model in response to the amount of snapshots stored in memory reaching a threshold. In an example, the snapshot can be added to one or more previously obtained snapshots to accumulate multiple snapshots into the training data.

The process 400 can proceed from block 406 to block 408. At block 408, the processor may generate a computer program based on the trained machine learning (ML) model. The computer program may include a set of instructions for setting a field value of an object among the set of related objects. In an example, the processor may apply a set of grammar rules on the relationships among the set of related objects indicated by the machine learning (ML) model to generate the computer program. The processor may identify an input field and an operation, based on the applied grammar rules. An application of the identified operation on the input field may output a result for setting the field value of the object among the set of related objects. In an example, the processor may determine a new relationship among the plurality of objects based on the machine learning (ML) model. The processor may update a memory storing a plurality of relationships among the plurality of objects in the GRC system with the determined new relationship.

In an example, the processor may enable the computer program on an application. In an example, prior to enabling the computer program, the processor may output the computer program on a user interface. The processor may receive user input indicating approval of the computer program. The processor may enable the computer program in response to receiving the user input indicating approval of the computer program. In an example, the processor may receive user input indicating a need to revise the computer program. The processor may revise the computer program based on user input indicating the need to revise the computer program.

In an example, the processor may run the computer program using a default value of an input field of the computer program to set the field value of the object among the set of related objects to a result value. The processor may compare the result value with a threshold. The processor may adjust the default value of the input field based on the comparison of the result value with the threshold. The processor may continue to perform the running, comparing, and adjusting until the result value reaches the threshold. The processor may set a constraint on the input field of the computer program in response to the result value reaching the threshold.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
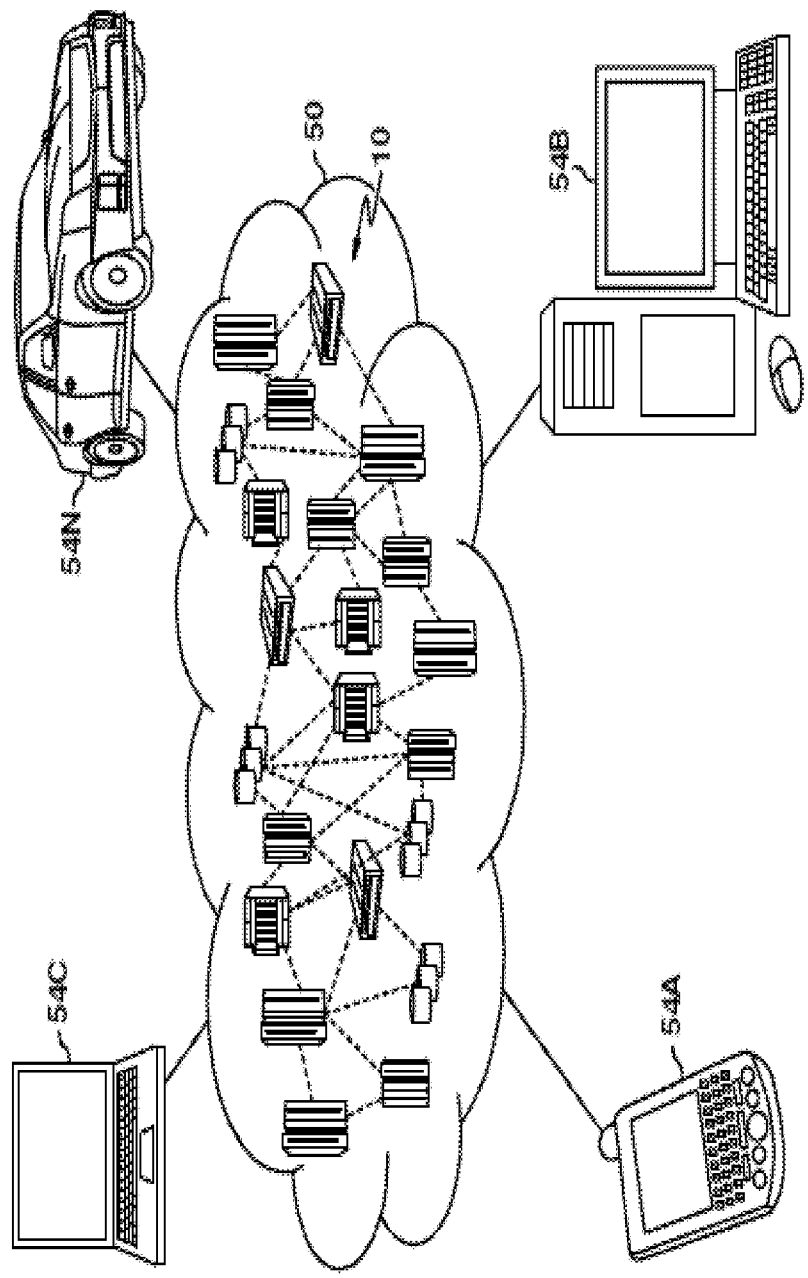
FIG. 5 depicts a cloud computing environment according to an embodiment of the present disclosure.

FIG. 5 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 6:
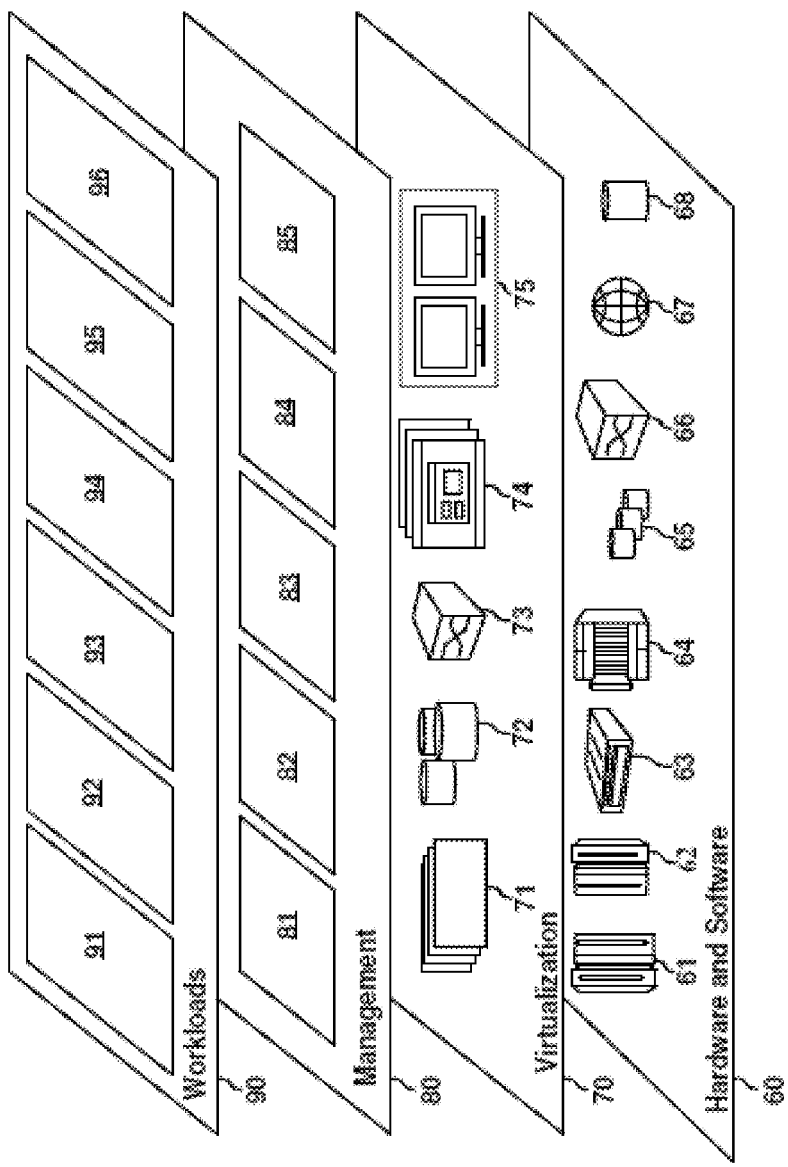
FIG. 6 depicts abstraction model layers according to an embodiment of the present disclosure.

FIG. 6 depicts abstraction model layers according to an embodiment of the present invention. Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning application 96.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. It must also be noted that, as used in the specification and the appended claims, the singular forms "a", "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of generating a computer program for a governance, risk, compliance (GRC) system, the method comprising:
    detecting, by a processor, at least one change made to a plurality of objects of a database in a GRC system;
    generating, by the processor, a plurality of snapshots of the database, wherein a snapshot of the database is generated in response to every change among the at least one change detected by the processor and each snapshot of the database includes a corresponding detected change made to the plurality of objects;
    training, by the processor, a machine learning model using the plurality of snapshots of the database, the trained machine model indicating relationships among a set of related objects, wherein the related objects are among the plurality of objects;
    applying, by the processor, a set of grammar rules on the relationships among the set of related objects, and fields of the set of related objects, indicated by the machine learning model to generate a computer program, wherein the computer program comprises a set of instructions for performing a set field operation on at least one object among the set of related objects; and
    identifying, by the processor, an input field and an operation, based on the applied grammar rules, wherein an application of the identified operation on the input field outputs a result for performing the set field operation on the at least one object among the set of related objects.

2. The computer-implemented method of claim 1, further comprising enabling, by the processor, the computer program on an application.

3. The computer-implemented method of claim 2, further comprising: outputting, by the processor, the computer program on a user interface; and
    receiving, by the processor, a user input indicating an approval of the computer program, wherein enabling the computer program is performed in response to receiving the user input indicating the approval of the computer program.

4. The computer-implemented method of claim 2, further comprising:
    outputting, by the processor, the computer program on a user interface;
    receiving, by the processor, a user input indicating a need to revise the computer program; and
    revising, by the processor, the computer program based on the user input indicating the need to revise the computer program.

5. The computer-implemented method of claim 1, further comprising:
    determining, by the processor, a new relationship among the plurality of objects based on the machine learning model; and
    updating, by the processor, a memory storing a plurality of relationships among the plurality of objects, and among fields of the plurality of objects, in the GRC system with the new relationship.

6. The computer-implemented method of claim 1, further comprising:
    running, by the processor, the computer program using a default value of an input field of the computer program to perform the set field operation on the at least one object among the set of related objects to a result value;
    comparing, by the processor, the result value with a threshold;
    adjusting, by the processor, the default value of the input field based on the comparison of the result value with the threshold, wherein the running, comparing, and adjusting are performed until the result value reaches the threshold; and
    setting, by the processor, a constraint on the input field of the computer program in response to the result value reaching the threshold.

7. The computer-implemented method of claim 1, further comprising:
    determining, by the processor, an of snapshots stored in a memory; and
    training, by the processor, the machine learning model in response to the amount of snapshots stored in the memory reaching a threshold.

8. A system comprising:
    a memory;
    a processor configured to be in communication with the memory, the processor being configured to:
        detect at least one change made to a plurality of objects of a database in a governance, risk, compliance (GRC) system;
        generate a plurality of snapshots of the database, wherein a snapshot of the database is generated in response to every change among the at least one change detected by the processor and each snapshot of the database includes a corresponding detected change made to the plurality of objects;
        train a machine learning model using the plurality of snapshots of the database, the trained machine model indicating relationships among a set of related objects, wherein the related objects are among the plurality of objects;
        apply a set of grammar rules on the relationships among the set of related objects, and fields of the set of related objects, indicated by the machine learning model to generate a computer program, wherein the computer program comprises a set of instructions for performing a set field operation on at least one object among the set of related objects; and
        identify an input field and an operation, based on the applied grammar rules, wherein an application of the identified operation on the input field outputs a result for performing the set field operation on the at least one object among the set of related objects.

9. The system of claim 8, wherein the processor is further configured to enable the computer program on an application.

10. The system of claim 9 wherein the processor is further configured to:
output the computer program on a user interface; and
receive a user input indicating an approval of the computer program, wherein enabling the computer program is performed in response to receiving the user input indicating the approval of the computer program.

11. The system of claim 9, wherein the processor is further configured to:
output the computer program on a user interface;
receive a user input indicating a need to revise the computer program; and
revise the computer program based on the user input indicating the need to revise the computer program.

12. The system of claim 8, wherein the memory is configured to store a plurality of relationships among the plurality of objects in the GRC system, and among fields of the plurality of objects, and the processor is further configured to:
determine a new relationship among the plurality of objects based on the machine learning model; and
update the memory with the new relationship.

13. The system of claim 8, wherein the processor is further configured to:
run the computer program using a default value of an input field of the computer program to perform the set field operation on the at least one object among the set of related objects to a result value;
compare the result value with a threshold;
adjust the default value of the input field based on the comparison of the result value with the threshold, wherein the running, comparing, and adjusting are performed until the result value reaches the threshold; and
set a constraint on the input field of the computer program in response to the result value reaches the threshold.

14. The system of claim 8, wherein the processor is further configured to:
determine an amount of snapshots stored in the memory; and
train the machine learning model in response to the amount of snapshots stored in the memory reaching a threshold.

15. A computer program product for generating a computer program in a GRC system, the computer program product comprising a computer readable storage medium having program instructions embodied therewith, the program instructions executable by a processing element of a device to cause the device to:
detect at least one change made to a plurality of objects of a database in a governance, risk, compliance (GRC) system;
generate plurality of snapshots of the database, wherein a snapshot of the database is generated in response to every change among the at least one change detected by the processor and each snapshot of the database includes a corresponding detected change made to the plurality of objects;
train a machine learning model using the plurality of snapshots of the database, the trained machine model indicating relationships among a set of related objects, wherein the related objects are among the plurality of objects;
apply a set of grammar rules on the relationships among the set of related objects, and fields of the set of related objects, indicated by the machine learning model to generate a computer program, wherein the computer program comprises a set of instructions for performing a set field operation on at least one object among the set of related objects; and
identify an input field and an operation, based on the applied grammar rules, wherein an application of the identified operation on the input field outputs a result for performing the set field operation on the at least one object among the set of related objects.

16. The computer program product of claim 15, wherein the program instructions are further executable by the processing element of the device to cause the device to enable the computer program on an application.

17. The computer program product of claim 15, wherein the program instructions are further executable by the processing element of the device to cause the device to:
determine a new relationship among the plurality of objects based on the machine learning model; and
update a memory storing a plurality of relationships among the plurality of objects, and among fields of the plurality of objects, in the GRC system with the new relationship.

18. The computer program product of claim 15, wherein the program instructions are further executable by the processing element of the device to cause the device to:
run the computer program using a default value of an input field of the computer program to perform the set field operation on the at least one object among the set of related objects to a result value;
compare the result value with a threshold;
adjust the default value of the input field based on the comparison of the result value with the threshold, wherein the running, comparing, and adjusting are performed until the result value reaches the threshold; and
set a constraint on the input field of the computer program in response to the result value reaches the threshold.

* * * * *